United States Patent [19]
Hynes

[11] Patent Number: 5,345,579
[45] Date of Patent: Sep. 6, 1994

[54] APPROXIMATE MVA SOLUTION SYSTEM AND METHOD FOR USER CLASSES WITH A KNOWN THROUGHPUT RATE

[75] Inventor: Gary Hynes, Sacramento, Calif.

[73] Assignee: Hewlett-Packard Company, Palo Alto, Calif.

[21] Appl. No.: 591,980

[22] Filed: Oct. 1, 1990

[51] Int. Cl.⁵ .......................................... G06F 15/31
[52] U.S. Cl. ................... 395/500; 364/221.2; 364/916.3
[58] Field of Search ............... 395/500; 364/148, 801, 364/578

[56] References Cited

U.S. PATENT DOCUMENTS

| | | | |
|---|---|---|---|
| 4,590,581 | 5/1986 | Widdoes | 364/578 |
| 4,604,718 | 8/1986 | Norman | 364/578 |
| 4,937,770 | 6/1990 | Samuels | 364/578 |
| 5,088,058 | 2/1992 | Salsburg | 364/578 |

OTHER PUBLICATIONS

Lazowska, "Quantitive System Performance", pp. 42 & 43, Prentice-Hall 1984.
Baskett, F. et al., "Open, Closed, and Mixed Networks of Queues With Difference Classes of Customers", Journal of the Association for Computing Machinery, vol. 22, No. 2, Apr., 1975, pp. 248–260.
Lazowska, et al., Quantitative System Performance: Computer System Analysis Using Queueing Network Models, Algorithm 7.3, p. 143, Prentice-Hall, 1984.
Arnold O. Allen, Probability, Statistics, and Queueing Theory With Computer Science Applications, Second Edition, Academic Press, San Diego, pp. 415–417, 1990.

Primary Examiner—David Y. Eng

[57] ABSTRACT

The present invention is an application computer software program which operates on a computer software platform. The application computer software program of the present invention comprises systems and methods for solving models of computer systems. In other words, the application computer software program of the present invention comprises an implementation of a model solution. The present invention solves the problems inherent in prior solutions by advantageously using fixed class workloads, rather than transaction workloads, to represent those terminal and batch workloads which are specified with throughputs, rather than population. Additionally, the present invention advantageously implements a fixed class algorithm as the model solution.

12 Claims, 8 Drawing Sheets

APPROXIMATE MVA SOLUTION SYSTEM AND METHOD FOR USER CLASSES WITH A KNOWN THROUGHPUT RATE

BACKGROUND OF THE INVENTION

The present invention generally relates to computer-based systems and methods for solving computer system models.

Computer system models and model solutions are useful for capacity planning. For example, the computer system models and the model solutions are used for predicting the manner in which computer systems will react under future conditions and loads. Such predictions are valuable in determining whether or not the computer systems should be modified to accommodate the future conditions and loads.

The computer system models of the computer systems are developed by characterizing the computer systems' workloads. Conventionally, three workload classes exist: a terminal class, a batch class, and a transaction class. The computer systems may include combinations of the workload classes.

The terminal and batch classes represent closed classes. The closed classes are workload classes with finite populations (herein, population refers to the number of users, or customers, in the workload classes).

The transaction classes represent open classes. The open classes are workload classes with infinite populations. In other words, the open classes represent the closed classes with infinite populations. For a general discussion of modeling with the open and closed workload classes, see "Open, Closed, and Mixed Networks of Queues With Different Classes of Customers" by Baskett, Chandy, Muntz, and Palacios (*Journal of the Association for Computing Machinery*, April 1975), which is incorporated by reference in its entirety herein.

In the computer system models, the workload classes are specified using measured data.

For example, the terminal workload class is often specified by using such measured information as the average number of active terminals (that is, the population), the average think time (that is, the interval between a computer response and a user input), and the average demands (that is, the required service from each of the computer's resources).

The batch workload class is often specified by using such measured information as the average number of batch jobs (that is, the population) and the average demand.

The transaction workload class is specified by using such measured and projected information as the computer system throughput.

The model solutions are algorithms which receive as input the computer system models and which generate performance metrics of the computer systems. Depending on the content of the computer system models, the performance metrics may include throughput, response time, utilization, and population.

The model solutions are used to validate the computer system models and to perform capacity planning by using the computer system models.

An Approximate Closed Multiclass Mean Value Analysis (MVA) Algorithm is an example of a conventional Model Solution. The Approximate Closed Multiclass MVA Algorithm is often used when the computer system models include only the closed workloads (that is, the terminal and batch workloads), and the available measured information associated with the closed workloads includes the population (that is, the average number of active terminals for the terminal workloads and the average number of batch jobs for the batch workloads).

However, for both the terminal and batch workloads, the population size is often not available. Instead, the terminal and batch workloads are specified in terms of required throughput. In addition, projections of future computer loading are ordinarily stated in terms of required throughput, instead of population size.

The Approximate Closed Multiclass MVA Algorithm requires that the populations of the workloads be specified as inputs.

Therefore, in situations where the population size is not available, the Approximate Closed Multiclass MVA Algorithm cannot be used as the model solution.

For a description of the Approximate Closed Multiclass MVA Algorithm, see *Quantitative System Performance: Computer System Analysis Using Queueing Network Models* by Lazowska, Zahorjan, Graham, and Sevcik (Algorithm 7.3, page 143, Prentice-Hall, 1984), which is incorporated by reference in its entirety herein.

In a prior solution to this problem, those terminal and batch workloads which are specified in terms of throughput are approximated with the transaction workloads (as noted above, the transaction workloads are normally specified in terms of throughput). That is, in the computer system model, the terminal and batch workloads (which are specified in terms of throughput, not population) are replaced with transaction workloads. With the prior solution, a Mixed Multiclass Algorithm is used as the model solution.

However, there are problems with the prior solution. Specifically, use of the prior solution often results in a discrepancy between actual system measurements and the performance metrics generated by the Mixed Multiclass Algorithm. In other words, the Mixed Multiclass Algorithm (that is, the model solution) often fails to validate the computer system model.

The discrepancies of the prior solution result from the inherent error in representing the closed workloads (that is, the terminal and batch workloads) with the open workloads (that is, the transaction workloads). This is true because the closed work-loads, with finite populations, are poorly represented by the open workloads, with infinite populations.

There are further problems with the prior solution. Specifically, use of the prior solution alters the manner in which the closed workloads (some of which are approximated with the open workloads) interact. This is an effect of the Mixed Multiclass Algorithm, which in effect assigns higher priority on computer system resources to the open workloads over the closed workloads.

Also, the Mixed Multiclass Algorithm does not provide as output the population required to generate the specified throughput. This is a disadvantage of the Mixed Multiclass Algorithm, as the population value is often useful to know.

For a description of the Mixed Multiclass Algorithm, see *Probability, Statistics, and Queueing Theory with Computer Science Applications, Second Edition* by Arnold O. Allen (pages 415–417, Academic Press, San Diego, 1990), which is incorporated by reference in its entirely herein.

SUMMARY OF THE INVENTION

The present invention is an application computer software program which operates on a computer software platform.

The application computer software program of the present invention comprises systems and methods for solving models of computer systems. In other words, the application computer software program of the present invention comprises an implementation of a model solution.

The present invention solves the problems inherent in the prior solutions by advantageously using fixed class workloads, rather than the transaction workloads, to represent those terminal and batch workloads which are specified with throughputs.

Additionally, the present invention advantageously implements a fixed class algorithm as the model solution.

The fixed class workloads, or fixed throughput workloads, represent those terminal and batch work-loads which are specified in terms of throughput, not population. Correspondingly, non-fixed class work-loads represent those terminal and batch workloads which are specified in terms of population, not throughput.

Unlike the open workloads, the fixed class workloads do not have an infinite population. Rather, the fixed class workloads are like the terminal and batch workloads in that they all have finite populations.

There are several advantages of using the fixed class workloads instead of the transaction workloads. First, the fixed class workloads provide better approximations to the terminal and batch workloads than the transaction workloads. Second, the fixed class workloads do not distort the performance metrics for those terminal and batch workloads which are specified using population values. Third, the fixed class workloads yield the actual fixed class population sizes.

A better appreciation of these and other advantages and features of the present invention, as well as how the present invention realizes them, will be gained from the following detailed description and drawings of the various embodiments, and from the claims.

BRIEF DESCRIPTION OF THE DRAWINGS

The present invention will be described with reference to the accompanying drawings, wherein:

In FIG. 4, rectangles represent software modules and ovals represent the inputs and outputs of the software modules.

DETAILED DESCRIPTION OF THE PREFERRED EMBODIMENT

1. Overview of the Present Invention

The present invention comprises a computer-based system and method for solving computer system models. In other words, the present invention comprises a computer-based model solution.

The present invention solves the problems inherent in the prior solutions by advantageously using fixed class workloads, rather than the transaction workloads, to represent the terminal and batch workloads which are specified with throughputs.

Additionally, the present invention advantageously uses a fixed class algorithm as the model solution.

The fixed class workloads, or fixed throughput workloads, represent those terminal and batch work-loads which are specified in terms of throughput, not population. Correspondingly, non-fixed class work-loads represent those terminal and batch workloads which are specified in terms of population, not throughput.

Unlike the open workloads, the fixed class workloads do not have an infinite population. Rather, the fixed class workloads are like the terminal and batch workloads in that they all have finite populations.

There are several advantages of using the fixed class workloads instead of the transaction workloads. First, the fixed class workloads provide better approximations to the terminal and batch workloads than the transaction workloads. Second, the fixed class workloads do not distort the performance metrics for those terminal and batch workloads which are specified using population values. Third, the fixed class workloads yield the actual fixed class population sizes.

Figure 1:
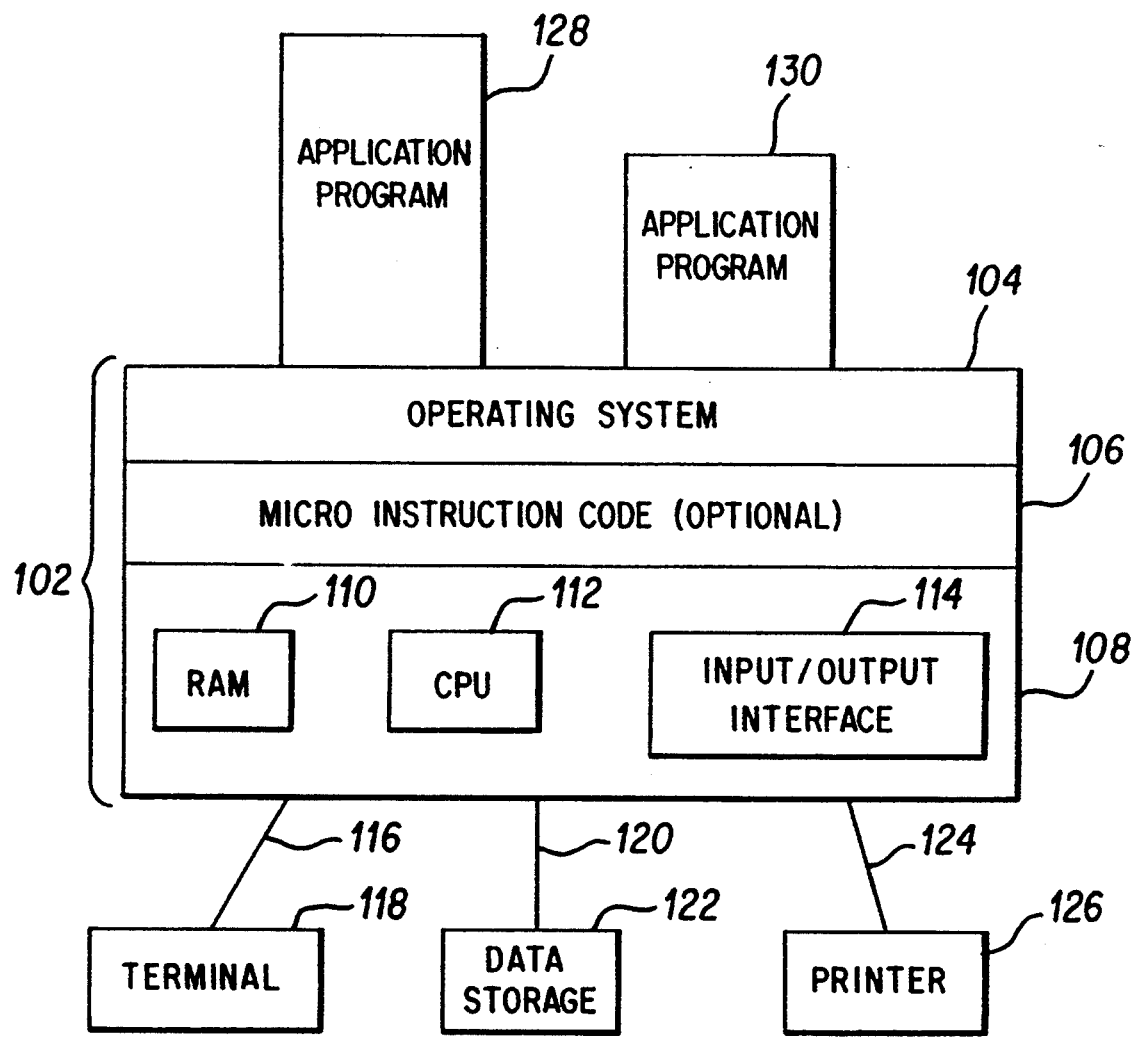
FIG. 1 shows a structural diagram which illustrates the computer hardware and software environment in which the present invention operates.

As shown in FIG. 1, the system of the present invention is an application computer software program 128 which operates on a computer platform 102. The computer platform 102 includes certain hardware units 108 including a central processing unit (CPU) 112, a random access memory (RAM) 110, and an input/output interface 114. The computer platform 102 also includes an operating system 104 and may include microinstruction code 106. Various peripheral components may be connected to the computer platform 102, such as a terminal 118, a data storage device 122, and a printing device 126.

In a preferred embodiment of the present invention 128, the computer platform 102 is an International Business Machines (IBM) compatible personal computer, such as an Hewlett Packard (HP) Vectra personal computer. The preferred operating system 104 which runs thereon is the Disk Operating System (DOS). Also, the system of the present invention 128 is preferably written in the Pascal computer programming language.

Figure 2:
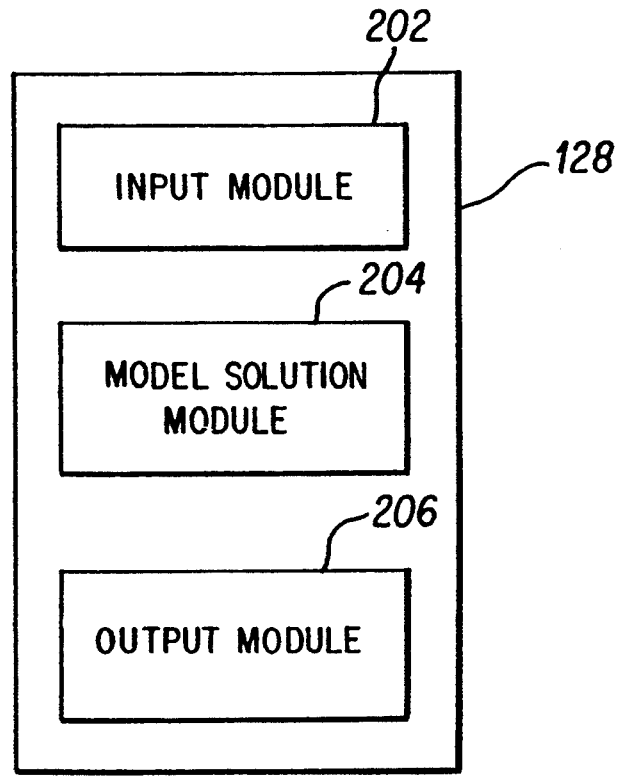
FIG. 2 shows a structural diagram of a preferred embodiment of the present invention.

A structural diagram of the application computer software program 128 of the present invention 128 is shown in FIG. 2. As shown in FIG. 2, the application computer software program 128 includes an input module 202, a model solution module 204, and an output module 206.

The application computer software program 128 is implemented in a machine independent manner. In particular, the model solution module 204 is implemented as a transportable software module such that the model solution module 204 is fully transportable, with no or with minor modifications, to multiple application programs 128, 130 operating on multiple computer platforms. For example, in addition to the HP Vectra personal computer, the model solution module 204 currently operates on HP3000 Series 9xx computer platforms (which operate under a Multiprogramming Executive operating system). Therefore, the present invention 128 is not limited to the computing environment of the preferred embodiment.

Figure 3:
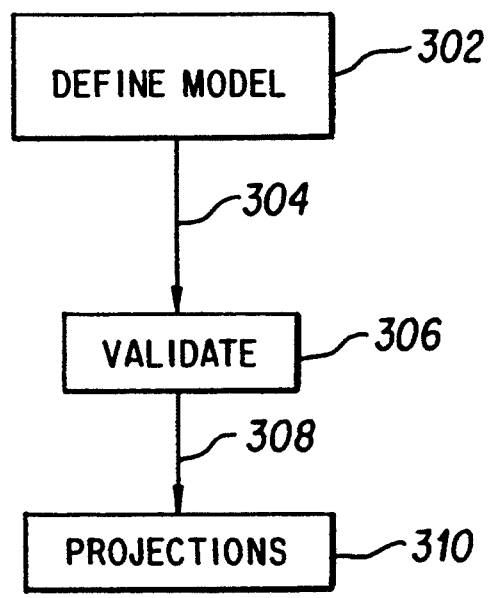
FIG. 3 shows a high-level functional flowchart of a preferred embodiment of the present invention.

A functional flowchart of the application computer software program 128 is shown in FIG. 3. As shown in FIG. 3, the operation of the application computer software program 128 essentially comprises three steps. In step 302, a model for a computer system is defined using measured data of the computer system. In step 306 the model is validated against the computer system using the measured data and the model solution module 204. In step 310, the model solution module 204 is used to project the manner in which the computer system will operate under different conditions and loads.

Figure 4:
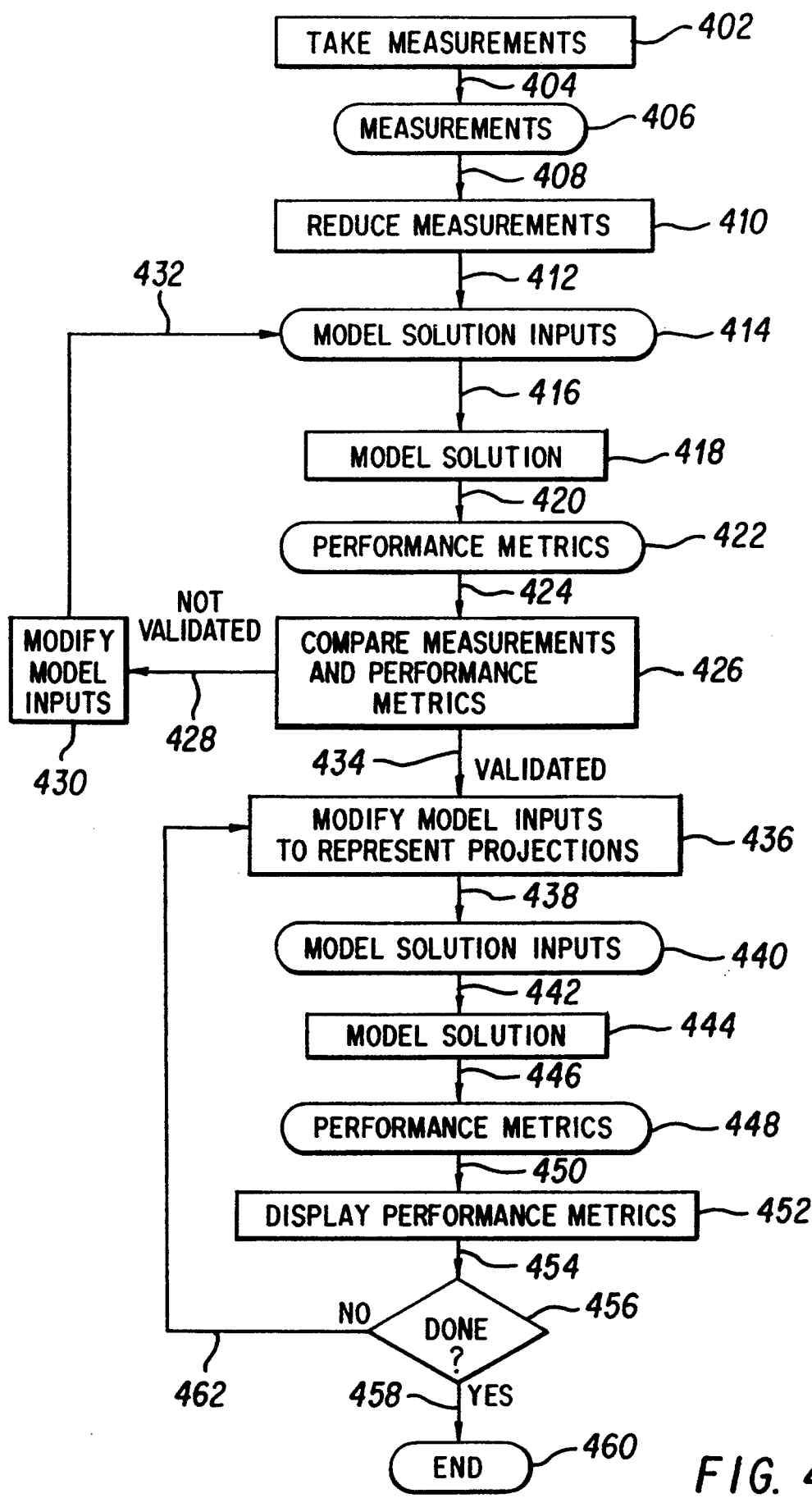
FIG. 4 shows a detailed structural diagram/functional flowchart of a preferred embodiment of the present invention.

FIG. 4 presents a more detailed functional flowchart of the application computer software program 128. The operation of the application computer software program 128 is described in detail below with reference to FIGS. 2 and 4.

In steps 402 and 410, a user (not shown in FIGS. 2 and 4) measures the performance of the computer system and classifies the computer system's workloads as either fixed or non-fixed. The computer system's workloads may be all fixed, all non-fixed, or a combination of fixed and non-fixed. The user may use the input module 202 to aid him in the performance of steps 402 and 410.

As a result of steps 402 and 410, model solution inputs 414 are produced. The model solution inputs 414 represent the model of the computer system. The model solution inputs 414 include required throughputs for the fixed classes and populations for the non-fixed classes. The model solution inputs 414 also include average think time and average demands. The user uses the input module 202 to input the model solution inputs 414 into the application computer software program 128. Steps 402 and 410 represent the define model step 302 in FIG. 3.

In step 418, the model solution module 204 receives the model solution inputs 414 and generates performance metrics 422 of the computer system model. The performance metrics 422 represent the manner in which the computer system would react under the conditions and loads which are specified in the model solution inputs 414. The output module 206 is used to display the performance metrics 422 to the user.

The model solution module 204 is discussed in detail below.

In step 426, the performance metrics 422 and measured data 406 are compared. An unfavorable comparision indicates that the model solution inputs 414 do not represent an accurate model of the computer system.

Step 430 is performed if the comparision in step 426 is unfavorable. In step 430, the model solution inputs 414 are modified and input again to the model solution module 204 (in step 418). The loop involving steps 418, 426 and 430 is performed until the comparision in step 426 is satisfactory (or until the measurements 406 are determined to misrepresent the computer system being modeled). This loop represents the validation step 306 in FIG. 3.

Step 436 is performed once the comparision in step 426 is satisfactory. In step 436, the model solution inputs 414 are modified to reflect new computer system conditions and loads. The user uses the input module 202 to input new model solution inputs 440.

In step 444, the model solution module 204 receives the model solution inputs 440 and generates performance metrics 448. The performance metrics 448 represent the manner in which the computer system would react to the conditions and loading as specified in the model solution inputs 440.

In step 452, the output module 206 displays the performance metrics 448.

In step 456, the user decides whether or not to continue operation of the application computer software program 128. The steps 436, 444, 452, and 456 represent the projections step 310 in FIG. 3.

As noted above, the present invention 128 uses the fixed class workloads, rather than the open workloads, to approximate those terminal and batch workloads which are specified in terms of throughput. Also, the present invention 128 uses the fixed class algorithm as the model solution. In other words, the present invention 128 uses a software implementation of the fixed class algorithm as the model solution module 204.

The model solution module 204 of the present invention 128, which implements the fixed class algorithm, is described in detail in the following sections.

2. Model Solution Module

As noted above, in the present system 128 the model solution module 204 represents a software implementation of the fixed class algorithm. Also as noted above, the model solution module 204 receives as input the model solution inputs 414. The model solution inputs 414 represent the model of the computer system wherein the computer system's work-loads have been classified as either fixed or non-fixed. The model solution inputs 414 include required throughputs for the fixed classes and populations for the non-fixed classes. The model solution inputs 414 also include average think time and average demands.

Figure 5:
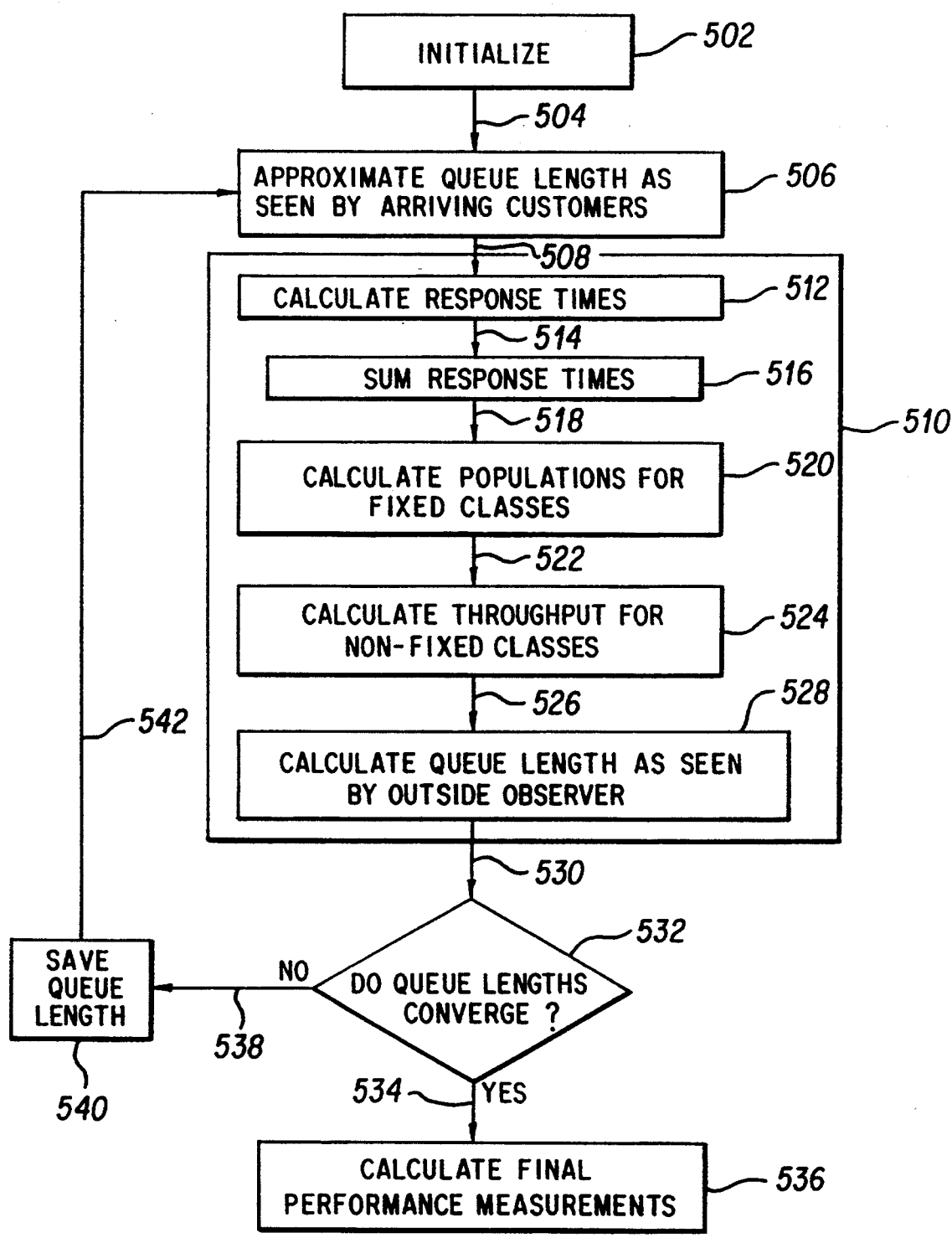
FIG. 5 shows a functional flowchart of a preferred embodiment of a model solution module.

A functional flowchart of the model solution module 204 is presented in FIG. 5. The operation of the model solution module 204 is described below with reference to FIGS. 2 and 5.

In step 502, the model solution module 204 initializes fixed class workload populations to initial values. Fixed class workloads are considered to be batch workloads if the associated think times equal zero and to be terminal workloads otherwise. In the preferred embodiment of the present invention 128, the fixed class workload populations are initialized to (somewhat) arbitrary values such as 1 for batch classes and to 100 for terminal classes.

Also in step 502, the model solution module 204 calculates average queue length guesses as seen by outside observers. Service centers represent such elements of the computer system as central processing units (CPU) and input/output devices. The queue length values represent the number of customers waiting to access the service centers.

The queue length values as seen by outside observers are used in step 532 to determine convergence. The queue length values calculated in step 502 represent "old" queue length values.

In step 506, the model solution module 204 calculates queue length values at the service stations as seen by arriving customers.

In steps 512, 516, 520, and 524, the model solution module 204 uses the results of steps 502 and 506 to calculate response times for the fixed and non-fixed workloads, response time sums, populations for the fixed class workloads, and throughputs for the non-fixed class workloads.

In step 528, the model solution module 204 uses the information calculated in steps 512, 516, 520, and 524 to calculate new values for the queue lengths as seen by outside observers.

In step 532, the model solution module 204 compares the old queue length values (as calculated in step 502 or as saved in step 540) with the new queue length values (as calculated in step 528).

Step 540 is performed if the queue length values are not within a specified convergence criterion (that is, if the queue length values have not converged). In step 540, the new queue length values (as calculated in step 528) are stored as the old queue length values.

As shown in FIG. 5, the model solution module 204 then performs steps 506, 512, 516, 520, 524, 528, and 532 again. The loop represented by steps 506, 512, 516, 520, 524, 528, 532, and 540 is performed by the model solution module 204 until the queue lengths as seen by outside observers converge (that is, are within the specified convergence criterion).

Step 536 is performed once the queue lengths as seen by outside observers converge. In step 536, the model solution module 204 calculates final performance metrics 422, 448, including throughput for non-fixed class workloads and population for fixed class workloads.

The operation of the model solution module 204, as represented in FIG. 5 and as described above, is described in further detail below according to the preferred embodiment of the present invention 128.

In the discussion below, c represents a workload class and C represents the number of workload classes. {F} represents an index set of the fixed classes in the model of the computer system. Thus, if $c \in \{F\}$, then workload class c is a fixed class workload. If $c \notin \{F\}$, then class c is not a fixed class workload and is instead a batch or terminal workload specified in terms of population.

$\vec{N}$ is a population vector of length C having the following values:

$$N_c = \begin{cases} N_c & \text{if } c \notin \{F\} \\ 0 & \text{if } c \in \{F\} \end{cases} \quad (2.1)$$

Each workload class c has a service demand $D_{ck}$, $k=1,2,\ldots,K$.

$\vec{I}$ is a C dimensional vector of specified throughputs where $I_c$ is empty if $c \notin \{F\}$ and $I_c$ is the specified throughput for the class if $c \in \{F\}$.

T is a C dimensional vector where $T_c$ is the mean think time for class c customers.

$L_{ck}[\vec{N}]$ is a vector of the queue lengths at the service centers as seen by outside observers.

$A_{ck}[\vec{N}]$ is a vector of the queue lengths at the service centers as seen by arriving customers.

$W_{ck}[\vec{N}]$ is a vector of response times for the fixed and non-fixed class workloads.

$W_c[\vec{N}]$ is a vector of response time sums.

$\lambda_c[\vec{N}]$ is a vector of throughputs.

E is the specified convergence criterion.

In step 502, the model solution module 204 performs the following operations.

If $c \in \{F\}$, set $$N_c = \begin{cases} 1 & \text{if } T_c = 0 \\ 100 & \text{if } T_c \neq 0 \end{cases} \quad (2.2)$$

Set $$L_{ck}^{(1)}[\vec{N}] = \frac{D_{ck}}{\sum_{k=1}^{k} D_{ck} + T_c} \times N_c \quad (2.3)$$

for all c and k.

In step 506, the model solution module 204 calculates $$A_{ck}[\vec{N}] = \frac{N_c - 1}{N_c} L_{ck}^{(1)}[\vec{N}] + \sum_{\substack{j=1 \\ j \neq c}}^{c} L_{jk}^{(1)}[\vec{N}] \quad (2.4)$$

for all c and k.

In step 512 the model solution module 204 uses the estimate for $A_{ck}[\vec{N}]$ from step 506 to calculate $$W_{ck}[\vec{N}] = D_{ck}[1 + A_{ck}[\vec{N}]], \quad (2.5)$$

for all c and k.

In step 516 the model solution module 204 calculates $$W_c[\vec{N}] = \sum_{k=1}^{K} W_{ck}[\vec{N}], \quad (2.6)$$

for $c=1,2,\ldots,C$.

In step 520, for all $c \in \{F\}$, the model solution module 204 sets $\lambda_c = I_c$ and sets $$N_c = \lambda_c(T_c + W_c). \quad (2.7)$$

In step 524, for all $c \notin \{F\}$, the model solution module 204 calculates $$\lambda_c[\vec{N}] = \frac{N_c}{T_c + W_c[\vec{N}]} \quad (2.8)$$

In step 528, the model solution module 204 calculates $$L_{ck}^{(2)}[\vec{N}] = \lambda_c[\vec{N}] W_{ck}[\vec{N}] \quad (2.9)$$

for $C=1,2,\ldots,C$ and $k=1,2,\ldots,K$.

In step 532, the model solution module 204 tests for convergence. Specifically, if $$|L_{ck}^{(1)}[\vec{N}] - L_{ck}^{(2)}[\vec{N}]| < E \quad (2.10)$$

for all c and k, then the model solution module 204 continues to step 536. Otherwise, the model solution module reloops to step 506 after replacing $L_{ck}^{(1)}[\vec{N}]$ by $L_{ck}^{(2)}[\vec{N}]$ for all c and k in step 540.

In step 536, the model solution module 204 sets $W_{ck}[\vec{N}]$, $W_c[\vec{N}]$, and $\lambda_c[\vec{N}]$ to the values calculated in steps 512, 516, 524 for all values of c and k. For all c ∈ {F}, $N_c$ is the required number of customers in class c (that is, the population). If $L_k[\vec{N}]$ is desired as an output, the model solution module 204 calculates it using the following formula.

$$L_k[\vec{N}] = \sum_{c=1}^{C} L_{ck}[\vec{N}]. \quad (2.11)$$

3. Upper Bound Modification

The model solution module 204, as described above, is adequate under certain conditions. However, complications often arise. This section and the following sections describe modifications to the model solution module 204 to enable the model solution module to handle such complications.

An upper bound complication may arise if there is not sufficient computer resources available to allow a fixed class workload with a desired throughput to run on the computer system. With the unmodified model solution module 204, the upper bound complication prevents the model solution module 204 from converging. Specifically, the upper bound complication causes the model solution module 204 to generate larger and larger values of $N_c$ for the fixed class workload.

The model solution module 204 is modified with an upper bound modification in order to solve the upper bound complication. The addition of the upper bound modification is necessary to use the model solution module 204 as a general model solution.

According to the upper bound modification, a population upper bound is defined. Population sizes of the fixed class workloads are not allowed to exceed the population upper bound.

The population upper bound is either specified by users or is given a default value. The population upper bound should be assigned a value that is a little too large to be feasible. For example, if the computer system to be modeled cannot support a terminal class with more than 400 terminals, then the population upper bound should be set to 400.

Figure 6:
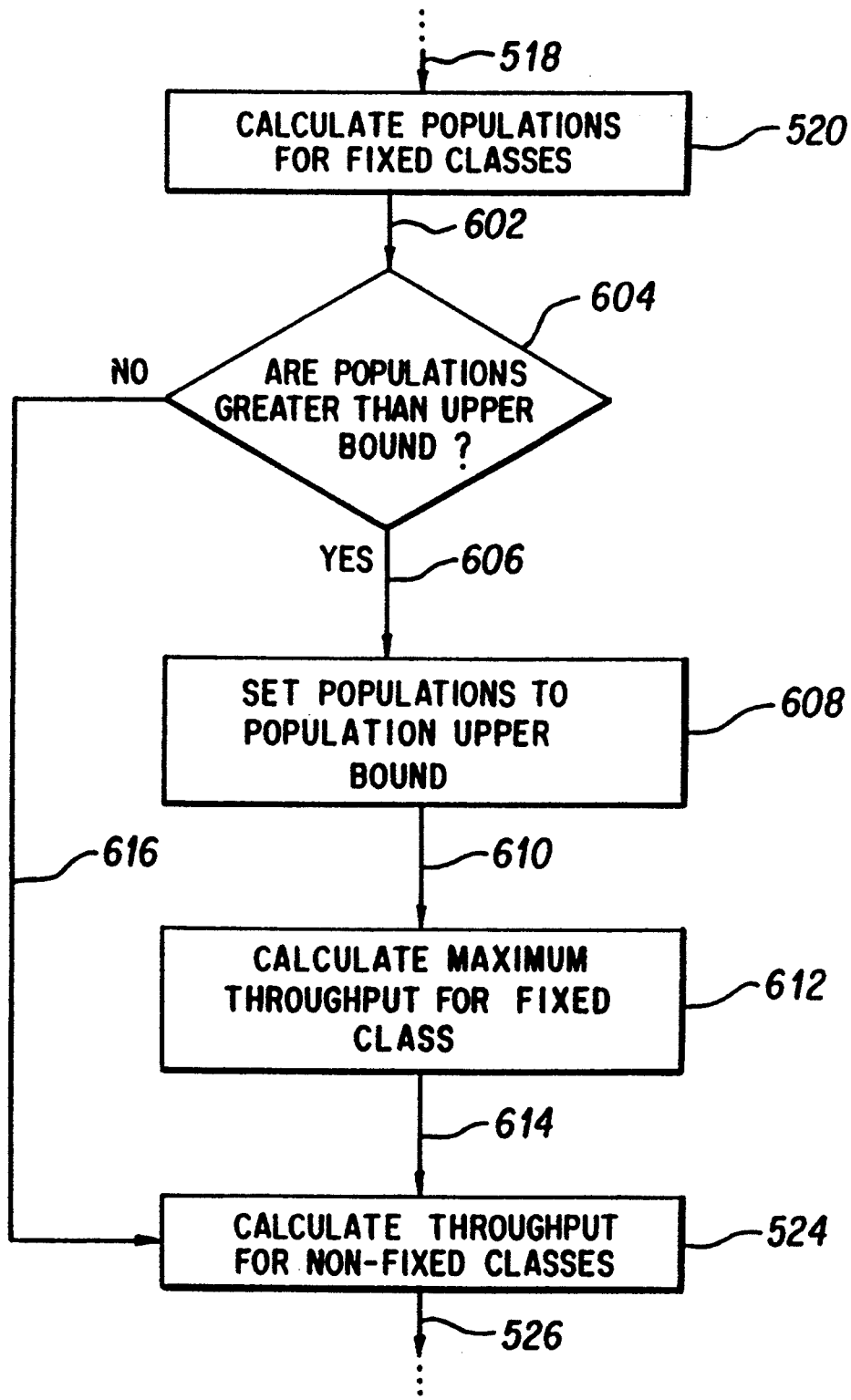
FIG. 6 presents a modified excerpt of the functional flowchart first shown in FIG. 5. The modified excerpt shown in FIG. 6 illustrates the operation of an upper bound modification to the model solution module.

Modifications to the operation of the model solution module 204 to implement the upper bound modification are shown in FIG. 6. As shown in FIG. 6, the functional flowchart of the model solution module 204 is the same as shown in FIG. 5, except a number of steps have been added between steps 520 and 524.

In step 604, after the populations for the fixed class workloads have been calculated in step 520, the model solution module 204 determines whether the populations for the fixed class workloads are greater than the population upper bound.

Step 608 is performed if any of the populations for the fixed class workloads exceed the population upper bound. Step 524 is performed if none of the populations for the fixed class workloads exceed the population upper bound.

In step 608, those fixed class workload populations which exceed the population upper bound are set to the population upper bound.

In step 612, maximum throughputs for those fixed class workloads which exceed the population upper bound are calculated according to the following formula.

$$\lambda_c = \frac{N_c}{T_c + W_c[\vec{N}]}. \quad (3.1)$$

The operation of the model solution module 204 then continues as before, starting with step 524.

4. Hypermode MVA Modification

The model solution module 204, which implements the fixed class algorithm, combined with the upper bound modification, is sufficient to effectively and efficiently model most computer systems. In some instances, however, the convergence is so slow that the computation time of the computer platform 102 is excessive.

In such instances, the convergence is complete except for a few of the workload classes. Often, all of the workload classes have converged except for one, usually a fixed class workload operating at a highly utilized server.

The model solution module 204 is modified with a hypermode MVA modification in order to solve this problem of slow convergence. The hypermode MVA modification is based on the observation that the values of many variables do not change between consecutive iterations of the model solution module's 204 operation.

Generally, the hypermode MVA modification operates by causing the model solution module 204 to make calculations for only those workloads that have not converged.

Figure 7:
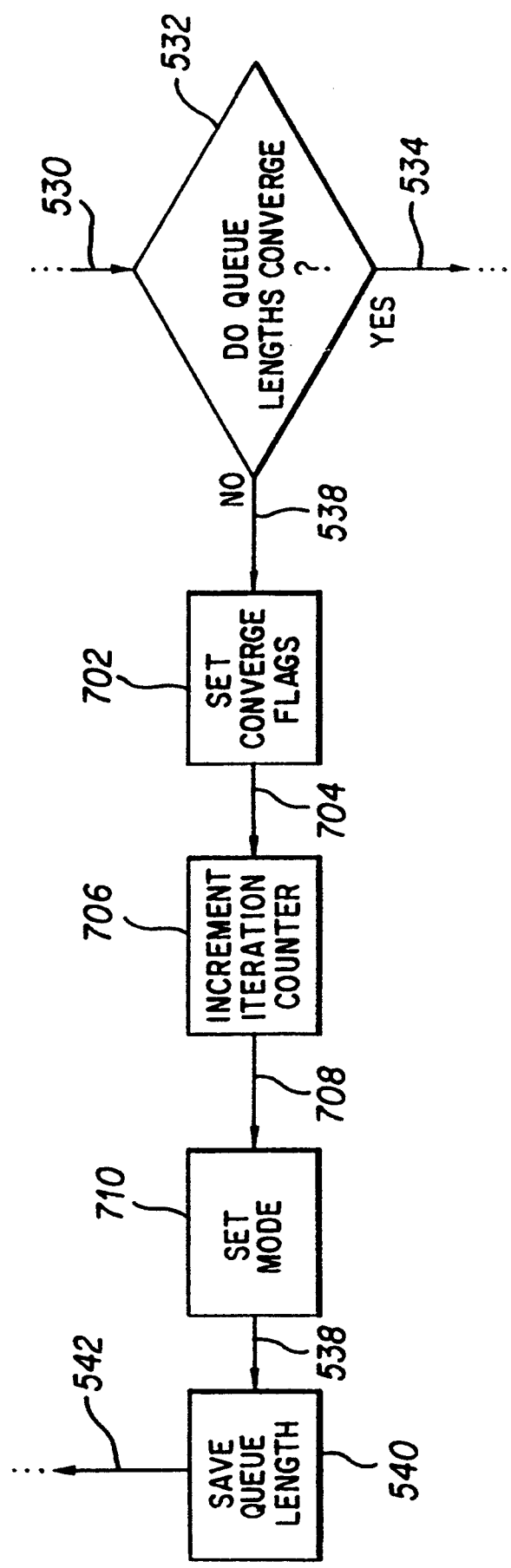
FIG. 7 presents a modified excerpt of the functional flowchart first shown in FIG. 5. The modified excerpt shown in FIG. 7 illustrates the operation of a hyper-mode modification to the model solution module.

Modifications to the operation of the model solution module 204 to implement the hypermode MVA modification are shown in FIG. 7. As shown in FIG. 7, the functional flowchart of the model solution module 204 is the same as shown in FIG. 5, except a number of steps have been added between steps 532 and 540.

To implement the hypermode MVA modification, the model solution module 204 (in Step 502) establishes a C (number of workloads) by K (number of service centers) convergence array. The convergence array contains flags which indicate convergence or nonconvergence for each c (workload) and k (service center) combination. Initially, all flags indicate nonconvergence. Also, the model solution module 204 (in Step 502) initially sets a mode flag to normal.

In step 702, after testing for convergence in step 532, the model solution module 204 indicates in the convergence array those c and k combinations that have converged.

In step 706, the model solution module 204 increments an iteration counter.

In step 710, the model solution module 204 sets the mode flag depending on the iteration counter. As noted above, the mode flag is initially set to normal. While in the normal mode, the model solution module 204 makes calculations (in steps 506, 512) for all c and k combinations, notwithstanding their convergence status.

After x iterations in the normal mode, the model solution module 204 in step 710 sets the mode flag to hypermode. While in the hypermode, the model solution module 204 makes calculations (in steps 506, 512) for only those c and k combinations that have not converged as indicated by the convergence array.

After y iterations in the hypermode, the model solution module 204 in step 710 sets the mode flag to normal and resets the convergence array. The model solution module 204 ensures that its operation does not end while in hypermode. The values of x and y are constants whose values are chosen empirically to fit the types of computer systems being modeled.

After setting the mode flag in step 710, the model solution module 204 resumes its normal operation (with the above modifications) with step 540.

5. Fixed Class Accelerator Modification

The model solution module 204 is modified with a fixed class accelerator modification in order to accelerate the convergence of those fixed class workloads where the convergence of $N_c$ is slow.

The fixed class accelerator modification maintains two parameters for each fixed class c: a current multiplier $m_c$ and a maximum multiplier $max_c$. These parameters are initialized to 1 and 1024, respectively.

Figure 8:
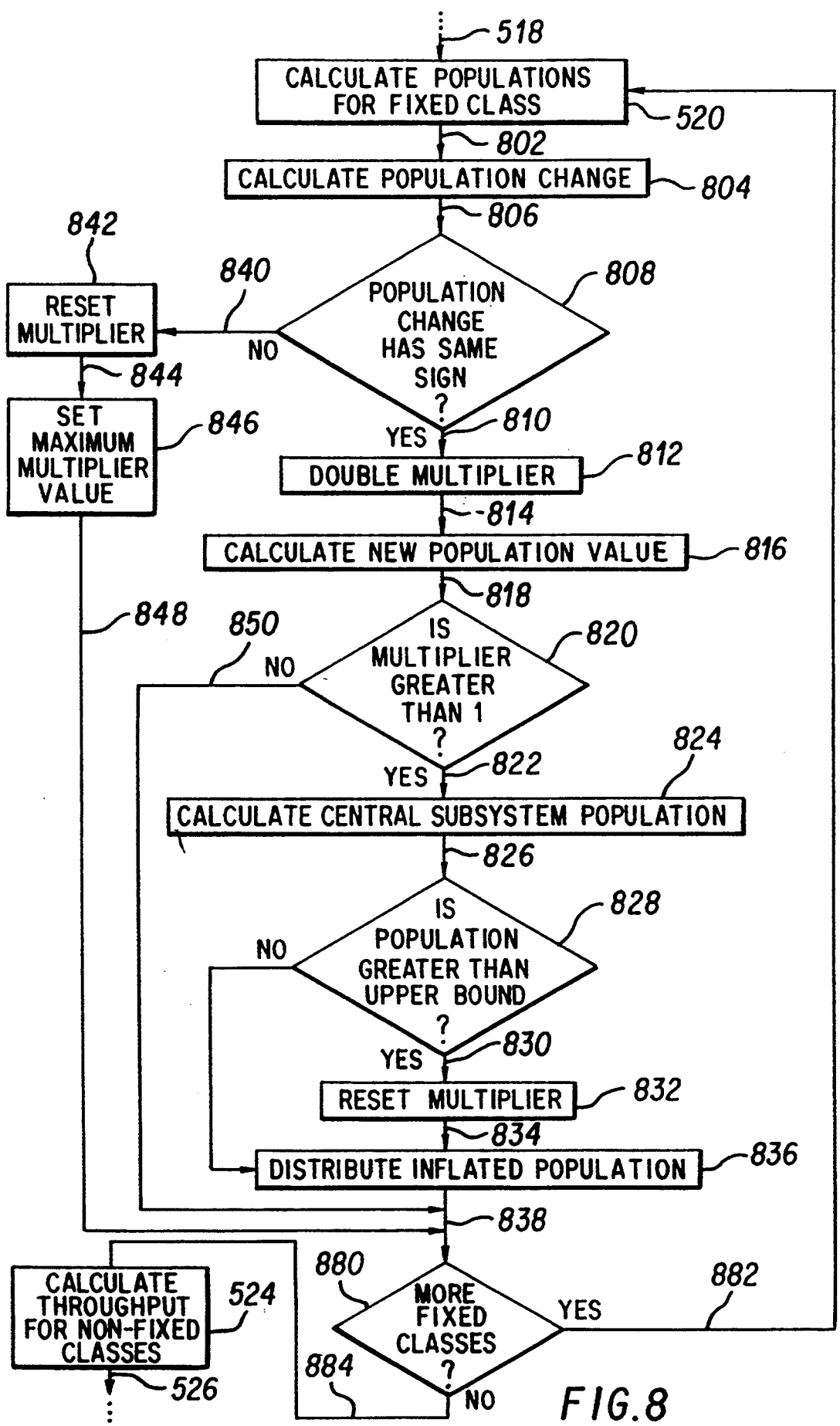
FIG. 8 presents a modified excerpt of the functional flowchart first shown in FIG. 5. The modified excerpt shown in FIG. 8 illustrates the operation of a fixed class accelerator modification to the model solution module.

Modifications to the operation of the model solution module 204 to implement the fixed class accelerator modification are shown in FIG. 8. As shown in FIG. 8, the functional flowchart of the model solution module 204 is the same as shown in FIG. 5, except a number of steps have been added between steps 520 and 524.

In step 520, the model solution module 204 calculates the population $N_c$ for a current fixed class.

In step 804, the model solution module 204 calculates the population change $\Delta_c$ between the population value $N_c$ of the current iteration and the population value $N_c$ of the previous iteration for the current fixed class. Positive values of the population change $\Delta_c$ correspond to positive changes in $N_c$ and negative values of the population change $\Delta_c$ correspond to negative changes in $N_c$.

In step 808, the model solution module 204 determines a convergence direction by checking the sign of the population change $\Delta_c$ (from step 804).

If the population change $\Delta_c$ does not have the same signed as on the previous iteration (that is, the convergence direction is oscillating), then steps 842 and 846 are performed. In step 842, the model solution module 204 resets the multiplier $m_c$ to one. In step 846 the model solution module 204 sets the maximum multiplier value $max_c$ as follows.

$$max_c = \begin{cases} max_c/2 & \text{if } max_c > 1 \\ 1 & \text{if } max_c = 1 \end{cases} \quad (5.1)$$

After performing step 846, the model solution module 204 loops back to step 520 (via step 880 if fixed classes remain to be processed. Other than step 524, the steps shown in FIG. 8 are performed for all the fixed classes.

Step 812 is performed if the population change $\Delta_c$ has the same sign as on the previous iteration (that is, the convergence direction is not oscillating). In step 812, the model solution module 204 doubles the value of the multiplier $m_c$ for the current fixed class. The model solution module 204 does not change the multiplier $m_c$ if the multiplier $m_c$ is already equal to $max_c$.

In step 816, the model solution module 204 calculates a new population value for the current fixed class according to the following equation.

$$N_{c,current} = N_{c,old} + m_c \times \Delta_c. \quad (5.2)$$

In step 820, the model solution module 204 checks the value of the multiplier $m_c$ (to determine if the population value was accelerated).

If $m_c$ is equal to 1, then the model solution module 204 loops back to step 520 (via step 880 if fixed classes remain to be processed.

If $m_c$ is greater than 1, then the following steps are performed.

In step 824, the model solution module 204 calculates a central subsystem population PopW (an inflated population) according to the following formula.

$$PopW = N_c - T_c\lambda_c \quad (5.3)$$

If the upper bound modification is being used, then in step 828 the model solution module 204 determines if the population value exceeds the maximum population value.

If the maximum population value is exceeded, then in step 832 the model solution module 204 resets the multiplier $m_c$ to 1. This disables the fixed class accelerator modification when the population exceeds the upper bound. The model solution module 204 also performs the steps as shown in FIG. 6.

After performing the steps related to the upper bound modification, or if the maximum population value is not exceeded, or if the upper bound modification is not being used, then the model solution module 204 performs step 836.

In step 836, the model solution module 204 distributes the inflated population across servers according to the following formula.

$$L_{ck} \leftarrow \frac{L_{ck}}{\sum_k L_{ck}} \times PopW \quad (5.4)$$

for k=1,2...,K.

After performing step 836, the model solution module 204 loops back to step 520 (via step 880 if fixed classes remain to be processed. Other than step 524, the steps shown in FIG. 8 are performed for all the fixed classes. If further fixed classes do not remain to be processed, the model solution module 204 resumes its normal operation with step 524.

The model solution module 204 can be modified with either the upper bound modification, the hypermode MVA modification, or the fixed class accelerator modification. Also, the model solution module 204 can be modified with any combination of the upper bound modification, the hypermode MVA modification, and the fixed class accelerator modification. Based on the discussion above, the manner in which to combine the upperbound modification, the hypermode MVA modification, and/or the fixed class accelerator modification with the model solution module 204 should be obvious to those with ordinary skill in the art.

6. Composite Class Algorithm

The fixed class accelerator modification ordinarily accelerates convergence. However, there is at least one case in which the benefits of the fixed class accelerator modification are nullified. This case occurs when multiple fixed classes are in the same priority class (when priorities are being used) or when multiple fixed classes are operating on a first-come-first-served (FCFS) basis.

In this case the benefits of the fixed class accelerator modification are nullified by the interaction between the fixed classes.

The model solution module 204 is modified with a composite class modification to prevent this problem.

The composite class modification is essentially a modification of the fixed class accelerator modification.

The composite class modification operates generally as follows. When there is more than one fixed class workload in a FCFS system or when there are two or more fixed class workloads at the same priority level in a priority system, then the populations of these fixed classes are lumped together into a composite class and the fixed class accelerator modification is applied at a composite class level.

Figure 9:
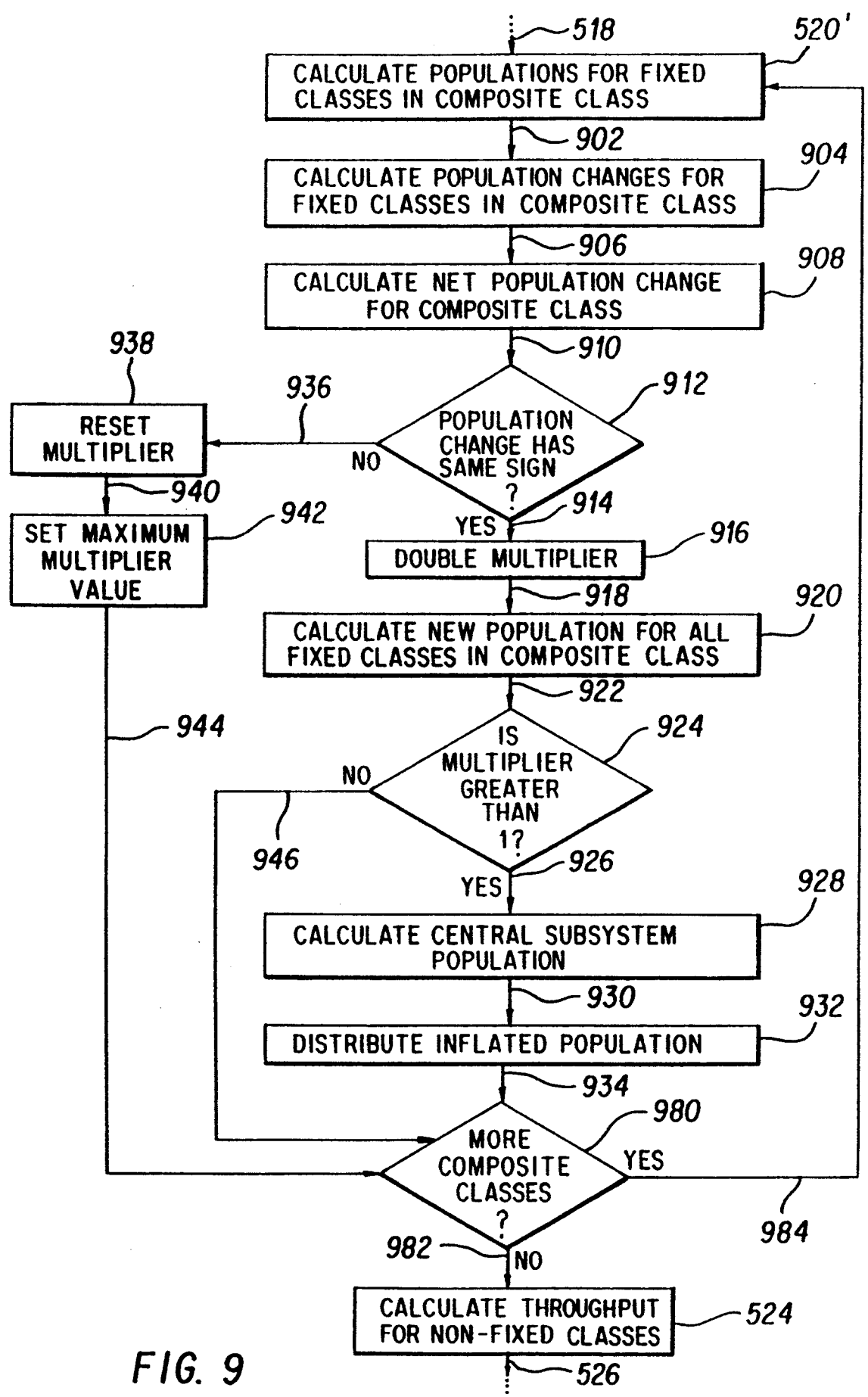
FIG. 9 presents a modified excerpt of the functional flowchart first shown in FIG. 5. The modified excerpt shown in FIG. 9 illustrates the operation of a composite class modification to the model solution module.

Modifications to the operation of the model solution module 204 to implement the composite class modification are shown in FIG. 9. As shown in FIG. 9, the functional flowchart of the model solution module 204 is the same as shown in FIG. 5, except that a number of steps have been added between steps 520 and 524.

In the discussion below, the fixed classes in the composite class are numbered $c_1, c_2, \ldots, c_i$.

Analogous to the fixed class accelerator modification, the composite class modification requires two parameters for each composite class: a current multiplier $m_c$ and a maximum multiplier $max_c$. These parameters are initialized to 1 and 1024, respectively.

In a modified step 520', the model solution module 204 calculates the population $N_{ci}$ for each fixed class in a current composite class according to the following formula.

$$N_c = I_{ci}(T_{ci} + W_{ci}[\vec{N}]) \quad (6.1)$$

In step 904, the model solution module 204 calculates the population change $\Delta_{ci}$ between the population value $N_{ci}$ of the current iteration and the population value $N_{ci}$ of the previous iteration for each fixed class in the current composite class. Note that, if a population value is greater than the population upper bound, then the model solution module 204 excludes that population value from all calculations regarding the composite class for the current iteration.

In step 908, the model solution module 204 calculates the net population change $\Delta_c$ of the current composite class by summing the individual population changes $\Delta_{ci}$ of the fixed classes in the current composite class.

In step 912, the model solution module 204 determines the convergence direction by checking the sign of the population change $\Delta_c$ (from step 908).

If the population change $\Delta_c$ does not have the same signed as on the previous iteration (that is, the convergence direction is oscillating), then steps 938 and 942 are performed. In step 938, the model solution module 204 resets the multiplier $m_c$ to one. In step 942, the model solution module 204 sets the maximum multiplier value $max_c$ as follows.

$$max_c = \begin{cases} max_c/2 & \text{if } max_c > 1 \\ 1 & \text{if } max_c = 1 \end{cases} \quad (6.2)$$

After performing step 942, the model solution module 204 loops back to step 520' (via step 980) if composite classes remain to be processed. Other than step 524, the steps shown in FIG. 9 are performed for all the composite classes.

Step 916 is performed if the population change $\Delta_c$ has the same sign as on the previous iteration (that is, the convergence direction is not oscillating). In step 916, the model solution module 204 doubles the value of the multiplier $m_c$ for the current composite class. The model solution module 204 does not change the multiplier $m_c$ if the multiplier $m_c$ is already equal to $max_c$.

In step 920, the model solution module 204 calculates new population values for the fixed classes in the current composite classes according to the following formula:

$$N_{ci,new} \leftarrow N_{ci,old} + \frac{N_{ci,new}}{\sum_j N_{cj,new}} \times \Delta_c \times m_c \quad (6.3)$$

for $i = 1, 2, \ldots, l_c$, and $j = 1, 2, \ldots l_c$, where $l_c$ is the number of fixed classes in the current composite class, and where $\Delta_c$ is the net population change for the composite class (from step 908).

In step 924, the model solution module 204 checks the value of the multiplier $m_c$.

If the multiplier $m_c$ is equal to one, then the model solution module 204 loops back to step 520' (via step 980) if composite classes remain to be processed.

If the multiplier $m_c$ is greater than one, then the model solution module 204 must redistribute the population by executing the steps 928 and 932 for each fixed class in the composite class.

In step 928, the model solution module 204 calculates the central subsystem population (that is, the inflated population) according to the following formula.

$$PopW = N_{ci} - T_{ci}\lambda_{ci}, \quad (6.4)$$

In step 932, the model solution module 204 distributes the inflated population according to the following assignment.

$$L_{ci,k} \leftarrow \frac{L_{ci,k}}{\sum_k L_{ci,k}} \times PopW, \quad (6.5)$$

for $i = 1, 2, \ldots, l_c$.

After performing step 932, the model solution module 204 loops back to step 520' (via step 980 if composite classes remain to be processed. Other than step 524, the steps shown in FIG. 9 are performed for all the composite classes. If composite classes do not remain to be processed, the model solution module 204 resumes its normal operation with step 524.

The composite class modification forces all population changes for the fixed classes in the composite class to move in the same direction on each iteration.

What is claimed is:

1. A computer-based, analytic modeling system for predicting the manner in which a computer system will operate under future conditions and loads, said computer-based modeling system comprising:
    (1) first means for entering information, wherein said information represents an analytic model of the computer system, and wherein said model comprises fixed class workloads and non-fixed class workloads;
    (2) second means for solving said model to generate performance metrics, said performance metrics representing indicia for predicting the manner in which the computer system will operate under future conditions and loads; and
    (3) third means for displaying said information and said performance metrics; said second means comprising fourth means for setting first queue lengths to initial values representing estimates of average queue lengths at service stations as seen by outside observers, the service stations representing elements in the computer system, fifth means for initializing populations of said fixed class workloads to predetermined values, sixth means for setting second queue lengths to estimates of queue lengths at the service stations as seen by arriving customers, seventh means for calculating response times for said fixed and non-fixed class workloads using said second queue lengths, eighth means for summing said response times for said fixed and non-fixed class workloads, ninth means for calculating new population values for said fixed class workloads using said response times sums for said fixed class workloads, tenth means for calculating throughputs for said non-fixed class workloads using said response times sums for said non-fixed class workloads, eleventh means for calculating new values for said first queue lengths using said response times sums for said fixed and non-fixed class workloads, and twelfth means for testing for convergence of said first queue lengths by comparing said new first queue length values with said initial first queue length values, said performance metrics being accurate measures of how the computer system will operate under future conditions and loads once said convergence occurs.

2. A computer-based, analytic model solution system for solving a model of a computer system such that operation of the computer system under future loads and conditions can be predicted, wherein said model comprises fixed class workloads and non-fixed class workloads, said computer-based model solution system comprising:

first means for setting first queue lengths to initial values representing estimates of average queue lengths at service stations as seen by outside observers, the service stations representing elements in the computer system;

second means for initializing populations of said fixed class workloads to predetermined values, wherein said second means comprises means for initializing batch fixed class workload populations to a first initial value and terminal fixed class workload populations to a second initial value;

third means for setting second queue lengths to estimates of queue lengths at the service stations as seen by arriving customers;

fourth means for calculating response times for said fixed and non-fixed class workloads using said second queue lengths;

fifth means for summing said response times for said fixed and non-fixed class workloads;

sixth means for calculating new population values for said fixed class workloads using said response times sums for said fixed class workloads;

seventh means for calculating throughputs for said non-fixed class workloads using said response times sums for said non-fixed class workloads;

eighth means for calculating new values for said first queue lengths using said response times sums for said fixed and non-fixed class workloads; and ninth means for testing for convergence of said first queue lengths by comparing said new first queue length values with said initial first queue length values, said performance metrics being accurate measures of how the computer system will operate under future conditions and loads once said convergence occurs.

3. The computer-based model solution system of claim 2, wherein said eighth means comprises:

means for comparing said new values to an upper bound; and means for setting said new values to said upper bound if said new values exceed said upper bound.

4. A computer-based method for solving an analytic model of a computer system such that operation of the computer system under future loads and conditions can be predicted, wherein said model comprises fixed class workloads and non-fixed class workloads, said method executed using a computer and comprising the steps of:

(a) setting first queue lengths to initial values representing estimates of average queue lengths at service stations as seen by outside observers, the service stations representing elements in the computer system;

(b) initializing populations of said fixed class workloads to predetermined values;

(c) setting second queue lengths to estimates of queue lengths at the service stations as seen by arriving customers;

(d) calculating response times for said fixed and non-fixed class workloads using said second queue lengths;

(e) summing said response times for said fixed and non-fixed class workloads;

(f) calculating new population values for said fixed class workloads using said response times sums for said fixed class workloads;

(g) if said new fixed class workload population values exceed an upper bound, then setting said new fixed class workload population values to said upper bound;

(h) calculating throughputs for said non-fixed class workloads using said response times sums for said non-fixed class workloads;

(i) calculating new values for said first queue length using said response times sums for said fixed and non-fixed class workloads; and (j) testing for convergence of said first queue lengths by comparing said new first queue length values with said initial first queue length values, said performance metrics being accurate measures of how the computer system will operate under future conditions and loads once said convergence occurs.

5. The method of claim 4, further comprising the step of calculating throughputs for said fixed class workloads.

6. A computer-based method for solving a model of a computer system such that operation of the computer system under future loads and conditions can be predicted, wherein said model comprises fixed class workloads and non-fixed class workloads, said method executed using a computer and comprising the steps of:

(a) initializing parameters, comprising the steps of:

(1) setting first queue lengths to initial values representing estimates of average queue lengths at service stations as seen by outside observers, the service stations representing elements in the computer system;

(2) initializing populations of said fixed class workloads to predetermined values; and (3) indicating whether said method is operating in a regular mode or a hypermode;

(b) setting second queue lengths to estimates of queue lengths at the service stations as seen by arriving customers;

(c) if said method is operating in said regular mode, then calculating performance metrics for all of said fixed and non-fixed class workloads, step (c) comprising the steps of:

(i) calculating response times for all of said fixed and non-fixed class workloads using said second queue lengths;

(ii) summing said response times for all of said fixed and non-fixed class workloads;

(iii) calculating new population values for all of said fixed class workloads using said response times sums for said fixed class workloads;

(iv) calculating throughputs for all of said non-fixed class workloads using said response times sums for said non-fixed class workloads;

(d) if said method is operating in said hypermode, then calculating performance metrics for any fixed and non-fixed class workloads which have not converged, step (d) comprising the steps of:

(i) calculating response times for any fixed and non-fixed class workloads which have not converged using said second queue lengths;

(ii) summing said response times for any fixed and non-fixed class workloads which have not converged;

(iii) calculating new population values for any fixed class workloads which have not converged using said response times sums for said fixed class workloads;

(iv) calculating throughputs for any non-fixed class workloads which have not converged using said response times sums for said non-fixed class workloads;

(e) calculating new values for said first queue length using said response times sums for said fixed and non-fixed class workloads; and (f) testing for convergence of said first queue lengths by comparing said new first queue length values with said initial first queue length values, said performance metrics being accurate measures of how the computer system will operate under future conditions and loads once said convergence occurs.

7. The method of claim 6, wherein step (a)(3) comprises the step of setting a mode flag to indicate that said method is operating in said regular mode.

8. The method of claim 7, wherein step (a) further comprises the steps of:

(4) initializing an iteration counter; and (5) initializing a convergence array, such that said convergence array indicates that said fixed and non-fixed class workloads have not converged;

and wherein step (f) comprises the steps of:

(1) identifying which of said fixed and non-fixed class workloads have converged, and indicating in said convergence array said identified fixed and non-fixed class workloads that have converged;

(2) incrementing said iteration counter; and (3) setting said mode flag to said hypermode when said iteration counter exceeds a predetermined value.

9. A computer-based method for solving a model of a computer system such that operation of the computer system under future loads and conditions can be predicted, wherein said model comprises fixed class workloads and non-fixed class workloads, said method executed using a computer and comprising the steps of:

(a) setting first queue lengths to initial values representing estimates of average queue lengths at service stations as seen by outside observers, the service stations representing elements in the computer system;

(b) initializing populations of said fixed class workloads to predetermined values;

(c) setting second queue lengths to estimates of queue lengths at the service stations as seen by arriving customers;

(d) calculating response times for said fixed and non-fixed class workloads using said second queue lengths;

(e) summing said response times for said fixed and non-fixed class workloads;

(f) selecting a current fixed class workload from said fixed class workloads;

(g) calculating a new population value for said current fixed class workload using said response times sums for said fixed class workloads;

(h) using said new population value and a previous population value of said current fixed class workload to calculate a population change of said current fixed class workload;

(i) determining a convergence direction of said current fixed class workload based on said population change;

if said convergence direction oscillates, then proceeding to step (n);

(k) calculating a current population value for said current fixed class workload based on said population change;

(l) calculating an inflated population for said current fixed class workload using said current population value;

(m) distributing said inflated population;

(n) performing steps (f)-(m) for each of said fixed class workloads;

(o) calculating throughputs for said non-fixed class workloads using said response times sums for said non-fixed class workloads;

(p) calculating new values for said first queue lengths using said response times sums for said fixed and non-fixed class workloads; and (q) testing for convergence of said first queue lengths by comparing said new first queue length values with said initial first queue length values, said performance metrics being accurate measures of how the computer system will operate under future conditions and loads once said convergence occurs.

10. A computer-based method for solving a model of a computer system such that operation of the computer system under future loads and conditions can be predicted, wherein said model comprises fixed class workloads and non-fixed class workloads, said method executed using a computer and comprising the steps of:

(a) setting first queue lengths to initial values representing estimates of average queue lengths at service stations as seen by outside observers, the service stations representing elements in the computer system;

(b) initializing populations of said fixed class workloads to predetermined values;

(c) creating composite classes, wherein said composite classes comprise subgroups of said fixed class workloads;

(d) setting second queue lengths to estimates of queue lengths at the service stations as seen by arriving customers;

(e) calculating response times for said fixed and non-fixed class workloads using said second queue lengths;

(f) summing said response times for said fixed and non-fixed class workloads;

(g) selecting a current composite class from said composite classes;

(h) calculating new population values for said fixed class workloads in said current composite class using said response times sums for said fixed class workload;

(i) calculating population changes for said fixed class workloads in said current composite class using said new population values and previous population values for said fixed class workloads in said current composite class;

calculating a net population change for said current composite class using said population changes;

(k) determining a convergence direction based on said net population change;

(l) if said convergence direction oscillates, then proceeding to step (p);

(m) calculating current population values for said fixed class workloads in said current composite class based on said population changes;

(n) calculating inflated populations for said fixed class workloads in said current composite class based on said current population values;

(o) distributing said inflated populations;

(p) performing steps (g)–(o) for each of said composite classes;

(q) calculating throughputs for said non-fixed class workloads using said response times sums for said non-fixed class workloads;

(r) calculating new values for said first queue lengths using said response times sums for said fixed and non-fixed class workloads; and (s) testing for convergence of said first queue lengths by comparing said new first queue length values with said initial first queue length values, said performance metrics being accurate measures of how the computer system will operate under future conditions and loads once said convergence occurs.

11. The method of claim 10, wherein said step (c) comprises the step of assigning said fixed class workloads with an identical priority level to one of said composite classes.

12. The method of claim 10, wherein said step (c) comprises the step of assigning said fixed class workloads operating in a FCFS system to one of said composite classes.

* * * * *